United States Patent
Geisler et al.

(10) Patent No.: US 8,908,989 B2
(45) Date of Patent: Dec. 9, 2014

(54) RECURSIVE CONDITIONAL MEANS IMAGE DENOISING

(71) Applicant: Board of Regents, the University of Texas System, Austin, TX (US)

(72) Inventors: Wilson S. Geisler, Austin, TX (US); Jeffrey S. Perry, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 13/965,073

(22) Filed: Aug. 12, 2013

(65) Prior Publication Data

US 2014/0126808 A1 May 8, 2014

Related U.S. Application Data

(60) Provisional application No. 61/721,617, filed on Nov. 2, 2012.

(51) Int. Cl.
G06K 9/40 (2006.01)
G06K 9/62 (2006.01)
G06T 5/00 (2006.01)

(52) U.S. Cl.
CPC ............. *G06K 9/6256* (2013.01); *G06T 5/002* (2013.01)
USPC ............................ 382/265; 382/159; 382/275

(58) Field of Classification Search
None
See application file for complete search history.

(56) References Cited

U.S. PATENT DOCUMENTS

| 5,684,720 | A | 11/1997 | Hein |
| 7,813,581 | B1 | 10/2010 | Fitzpatrick et al. |
| 2002/0034337 | A1* | 3/2002 | Shekter .................... 382/275 |
| 2002/0159649 | A1 | 10/2002 | Mollov et al. |
| 2007/0177817 | A1 | 8/2007 | Szeliski et al. |
| 2008/0239094 | A1 | 10/2008 | Baqai et al. |

(Continued)

FOREIGN PATENT DOCUMENTS

| JP | 2002/216127 | 8/2002 |
| JP | 2010/252265 | 11/2010 |
| WO | 2014/070273 | 5/2014 |
| WO | 2014/070489 | 5/2014 |

OTHER PUBLICATIONS

Wilson et al., "Statistics for optima I point prediction in natural images", Journal of Vision, vol. 11, No. 12, issue 14, Oct. 19, 2011, pp. 1-17.

(Continued)

*Primary Examiner* — Bhavesh Mehta
*Assistant Examiner* — David F Dunphy
(74) *Attorney, Agent, or Firm* — Kilpatrick Townsend & Stockton LLP

(57) ABSTRACT

Methods and composition for denoising digital camera images are provided herein. The method is based on directly measuring the local statistical structure of natural images in a large training set that has been corrupted with noise mimicking digital camera noise. The measured statistics are conditional means of the ground truth pixel value given a local context of input pixels. Each conditional mean is the Bayes optimal (minimum mean squared error) estimate given the specific local context. The conditional means are measured and applied recursively (e.g., the second conditional mean is measured after denoising with the first conditional mean). Each local context vector consists of only three variables, and hence the conditional means can be measured directly without prior assumptions about the underlying probability distributions, and they can be stored in fixed lookup tables.

20 Claims, 11 Drawing Sheets

(56) References Cited

U.S. PATENT DOCUMENTS

| | | | |
|---|---|---|---|
| 2009/0324117 A1 | 12/2009 | Demandolx | |
| 2010/0020208 A1* | 1/2010 | Barbu | 348/250 |
| 2010/0274746 A1* | 10/2010 | Rickert et al. | 706/14 |
| 2011/0102647 A1 | 5/2011 | Kim et al. | |

OTHER PUBLICATIONS

Buades A. et al., (2010) Image Denoising Methods: A new non-local method, *SIAM Review*. 52, 113-147.

P. Chatterjee et al., (2010) Is Denoising Dead? *IEEE Trans. on Image Processing*. 19, 895-911.

Wang Z. et al., (2004), Image quality assessment: From error visibility to structural similarity, *IEEE Trans. on Image Processing*.

Bishop, C. M. (2006), *Pattern recognition and machine learning*; New York: Springer.

D. T. Kuan, A. A. Sawchuk, T. C. Strand, and P. Chavel (1985) Adaptive noise smoothing filter for images with signal dependent noise, *IEEE Trans. PAMI*, vol. 7, pp. 165-177.

Liu C., et al., (2008) Automatic estimation and removal of noise from a single image. *IEEE Trans. Pattern Anal. & Mach. Intel.* 30, 299-314.

Tomasi C. et al., (1998) Bilateral filtering for gray and color images. *Proceedings IEEE Conference in Computer Vision*, Bombay, India.

A. Efros et al., (1999) Texture synthesis by non-parametric sampling, *Proceedings of the IEEE International Conference on Computer Vision*, 2, Corfu, Greece, 1033-1038.

R. R. Coifman et al., (1995) *Translation-invariant de-noising*, in Wavelets and Statistics, Lecture Notes in Statist., Springer-Verlag, New York, pp. 125-150.

J. Portilla et al., (2003) Image Denoising Using Scale Mixtures of Gaussians in the Wavelet Domain, *IEEE Trans. Image Processing*, 12, pp. 1338-1351.

K. Dabov et al., (2007), Image denoising by sparse 3D transform-domain collaborative filtering. *IEEE Trans. Image Process.*, 16, pp. 2080-2095.

L. Zhang et al., (2010), Two-stage denoising by principle components analysis with pixel grouping, *Pattern Recognition*, 43, 1531-1549.

Geisler, W. S. et al., (2011). Statistics for optimal point prediction in natural images. *Journal of Vision*, 11(12):14, 1-17.

Danielyan A. et al., (2009) *Proc. Local and Non-Local Approx. in Image Process.* 125-129.

Oruc, I. et al., (2003), Weighted linear cue combination with possibly correlated error, *Vision Research*, 43, 2451-2468.

Levin, A. et al., (2011) Natural image denoising: Optimality and inherent bounds. *IEEE Conference and Pattern Recognition and Computer Vision (CVPR)*. 2833-2940.

International Search Report corresponding to the PCT/US2013/054571 application, 2013.

International Search Report corresponding to the PCT/US2013/065786 application, 2014.

U.S. Appl. No. 61/721,617, filed Nov. 2, 2012.

* cited by examiner

RECURSIVE CONDITIONAL MEANS IMAGE DENOISING

CROSS REFERENCE TO RELATED APPLICATION

This application claims the benefit of U.S. Provisional Application No. 61/721,617 filed on Nov. 2, 2012, the entirety of which is incorporated by reference herein.

STATEMENT AS TO RIGHTS TO INVENTIONS MADE UNDER FEDERALLY SPONSORED RESEARCH AND DEVELOPMENT

This invention was made with government support 2 R01EY11747 awarded by the National Institutes of Health. The Government has certain rights in the invention.

BACKGROUND

Photon and sensor noise limit the performance of all imaging systems. Minimizing the effects of this noise is a universal and fundamental image processing task. Here, inter alia, this addresses the problem of denoising in still digital camera images, using a new approach that combines measurements of natural image statistics with measurements of the noise characteristics of digital cameras.

In general, a noisy image can be represented as an unknown "true" image that has been corrupted by noise. Let $z(x)$ represent the value of a pixel at location $x=(x,y)$ in the true image. Without loss of generality, the observed value is given by $z_0(x)=z(x)+n(x, z)$, wherein $n(x, z)$ is the noise, which may be spatially correlated and/or dependent on the true image values z.

The goal of denoising is to estimate $z(x)$ given the observed context of pixel values at and around the pixel location $c(x)$.

Conceptually, the optimal estimate is given by the standard formula from Bayesian statistical decision theory:

$$\hat{z}_{opt}(x) = \underset{\hat{z}(x)}{argmin} \sum_{z(x)} \gamma[z(x), \hat{z}(x)]p[z(x) \mid c(x)] \qquad (1)$$

where $\gamma[z(x), \hat{z}(x)]$ is the cost function, and $p[z(x)|c(x)]$ is the posterior probability of the true value given the observed context.

A vast number of different denoising methods have been proposed over the past several decades (for recent summaries see, for example, Buades A., Coll B. & Morel J. M. (2010) Image Denoising Methods: A new non-local method, *SIAM Review.* 52, 113-147; P. Chatterjee & P. Milanfar (2010) Is Denoising Dead?, *IEEE Trans. on Image Processing.* 19, 895-911). They can all be viewed as providing some form of sub-optimal approximation to the Bayes optimal estimate given by equation (1).

Most often, the explicit (or implicit) cost function is the squared error between the estimated and true pixel values $\gamma[z(x), \hat{z}(x)]=[z(x)-\hat{z}(x)]^2$. This cost function finds the estimate with the minimum mean squared error (MMSE) or equivalently the estimate with the maximum peak signal-to-noise ratio (PSNR). Other cost functions, such as those that are based on perceptual properties of the human visual system (see, e.g., Wang Z., Bovik A. C., Sheikh H. R., & Simoncelli E. P. (2004), Image quality assessment: From error visibility to structural similarity, *IEEE Trans. on Image Processing*), are worthy of consideration; however, as is common in the denoising literature, the present focuses on the squared-error cost function. For this cost function, equation (1) becomes:

$$\hat{z}_{opt}(x)=E[z(x)|c(x)] \qquad (2)$$

In other words, the Bayes optimal estimate is simply the expected value of the true pixel value given the observed context (see, e.g., Bishop, C. M. (2006), *Pattern recognition and machine learning*; New York: Springer).

In order to develop an optimal denoising method for a specific application, one can characterize both the signal (the statistical structure of true images) and the noise (the statistical structure of the noise). The various denoising methods can be distinguished based on assumptions they make about the structure of the signal and noise. Also important is the computational efficiency (speed and complexity). For a given application, the best method will be the one that jointly maximizes the approximation to equation (2) and the computational efficiency.

The earliest principled denoising method is known as the Wiener filter (Wiener, N. (1949). *Extrapolation, Interpolation, and Smoothing of Stationary Time Series*. New York: Wiley), which is an exact implementation of equation (2), under the assumption that both the signal and the noise are described by stationary (not necessarily white) Gaussian processes. However, images are generally non-stationary and hence this method does not produce good results for most images (it blurs edges and texture). Subsequently, there have been many attempts to weaken the assumption of global stationarity. Adaptive Wiener filtering methods assume Gaussian noise and signal that is locally stationary; the methods estimate the Gaussian parameters at each pixel location and then apply the Wiener filter with those parameters (e.g., D. T. Kuan, A. A. Sawchuk, T. C. Strand, and P. Chavel (1985) Adaptive noise smoothing filter for images with signal dependent noise, *IEEE Trans. PAMI, vol.* 7, pp. 165-177). A closely related approach combines image segmentation and Bayesian MAP estimation (Liu C., Szeliski R., Kang, S. B., Zitnick C. L. & Freeman W. T. (2008) Automatic estimation and removal of noise from a single image. *IEEE Trans. Pattern Anal. & Mach. Intell.* 30, 299-314). The critical component of these methods is estimating the local Gaussian parameters; the less noisy the estimated parameters the more accurate the denoising. Simple non-iterative methods for estimating the parameters that use only pixels in the immediate neighborhood of the pixel being denoised can be computationally efficient.

Other recent methods do not make explicit formal assumptions about the structure of the noise or signal, but instead exploit heuristic intuitions to average out the noise and leave the signal. One simple and effective method of this type is bilateral filtering (Tomasi C. & Manduchi R. (1998) Bilateral filtering for gray and color images. *Proceedings IEEE Conference in Computer Vision*, Bombay, India), which takes the weighted average of pixels in the local neighborhood, where the weights depend jointly on the spatial and gray-level (color) distance of the neighboring pixel from the pixel being denoised. The intuition is that spatially nearby pixels are positively correlated in gray level and can be averaged, but spatially nearby pixels that differ substantially in gray level usually contain strong signals (true image features) and should not be averaged. This method can be computationally efficient.

Related methods are those based on non-local averaging (A. Efros and T. Leung (1999) Texture synthesis by non-parametric sampling, *Proceedings of the IEEE International Conference on Computer Vision,* 2, Corfu, Greece, 1033-1038). For example, the NL-Means algorithm (Buades A., Coll B. & Morel J. M. (2010) Image denoising methods: A new non-local method. *SIAM Review.* 52, 113-147) searches for pixels whose local neighborhood in the image is similar to the neighborhood of the pixel being denoised. It then averages all these pixels to obtain the estimate. The more similar is the local neighborhood the greater is the weight given to the pixel when computing the average. The intuition is that natural images are statistically regular and hence if two image patches are similar in structure it is likely that the center pixels are similar and hence can be averaged to estimate the true image value. To the extent that this assumption is valid for the kind of noise in an imaging system and for the kinds of images being captured, such averaging could provide a good approximation to the right side of equation (2). Indeed, methods based on non-local averaging provide good results and are currently popular. However, these methods are less computationally efficient because of the need to make the neighborhood similarity measurements.

Another class of methods involves hard or soft thresholding following a linear transform, such as a wavelet or discrete cosine transform (R. R. Coifman and D. Donoho (1995) *Translation-invariant de-noising*, in Wavelets and Statistics, Lecture Notes in Statist., Springer-Verlag, New York, pp. 125-150; J. Portilla, V. Strela, M. J. Wainwright, and E. P. Simoncelli (2003) Image Denoising Using Scale Mixtures of Gaussians in the Wavelet Domain, *IEEE Trans. Image Processing*, 12, pp. 1338-1351). The intuition is that for appropriately chosen kernel shapes, the regular structure of natural images results in a very sparse representation (a few large kernel coefficients, with most near zero), whereas the much more random structure of noise results in a less sparse representation (many coefficients with modest values). Thus, thresholding out the smaller coefficients selectively removes the noise. These methods can be computationally efficient, but can be prone to producing ringing artifacts.

Currently denoising methods include hybrid methods (K. Dabov, A. Foi, V. Katkovnik, and K. Egiazarian (2007). Image denoising by sparse 3D transform-domain collaborative filtering. *IEEE Trans. Image Process.*, 16, pp. 2080-2095; L. Zhang, W. Dong, D. Zhang & G. Shi (2010); Two-stage denoising by principle components analysis with pixel grouping, *Pattern Recognition*, 43, 1531-1549). For example the BM3D method combines non-local averaging, cooperative linear transform thresholding, and Wiener filtering (K. Dabov, A. Foi, V. Katkovnik, and K. Egiazarian (2007); Image denoising by sparse 3D transform-domain collaborative filtering; *IEEE Trans. Image Process.*, 16, pp. 2080-2095).

In summary, most of the existing methods either assume Gaussian image and noise models, or principled heuristics based on qualitative properties of natural images. Further, the parameters of most denoising methods are estimated from the image being denoised. Thus, there is a need in the art for improved denoising methods.

SUMMARY

Provided herein, inter alia, are Recursive Conditional Means (RCM) denoising methods, that makes almost no assumptions about the underlying probability distributions, and that learn their estimates from the statistics of a large database of natural images. The fundamental idea is to directly measure the conditional means on the right side of equation (2) recursively for a number of different small neighborhoods (context regions). During denoising, each of these different neighborhoods provides an improved estimate of the denoised image pixel. Previous work has indicated that for the task of upsampling (super resolution), this approach is every effective and computationally efficient (Geisler, W. S., & Perry, J. S. (2011). Statistics for optimal point prediction in natural images. *Journal of Vision*, 11(12):14, 1-17, doi: 10.1167/11.12.14).

Conceptually, this approach is similar to non-local methods in that an estimate is based on the average across a large number of similar neighborhoods. The difference is that RCM neighborhoods are small enough that similar neighborhoods are identical, and hence there is no need for an arbitrary definition of similarity. Also, the neighborhoods are small enough that the conditional means can be learned precisely from a large set of natural images and then stored in tables. RCM denoising is extremely fast computationally because all the relevant statistics may be stored in fixed tables that can then be applied to any image.

DETAILED DESCRIPTION

Figure 1:
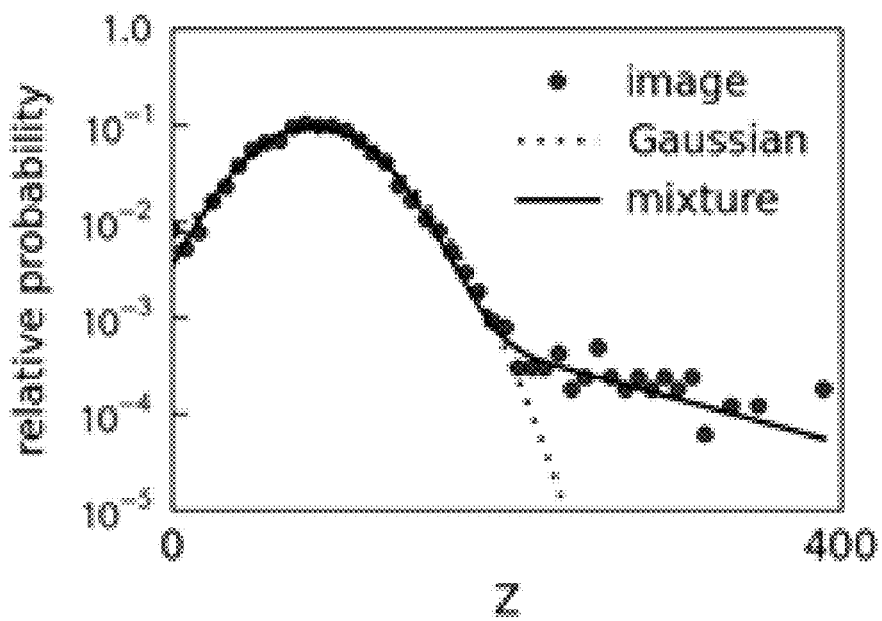
FIG. 1 shows a noise model fit for 14-bit flat-field red pixel image with mean value of 89.5.

Natural Image Point Prediction is used to estimate pixel values in digital images. It does this by finding the most likely estimate of the true or actual value of a pixel given its neighboring pixels.

Natural Image Point Prediction may be used whenever point prediction is desired in digital image processing. For example, point prediction is desired for image enlargement during the processes of interpolation and upsampling, which converts a digitized image to a higher sampling rate. Point prediction is used when an image is deblurred. In this case, existing pixels within an image are restored to near their true values: that is, their values before being blurred and/or downsampled. Point prediction is used to remove noise and artifacts from digital images. This image processing task is the emphasis of this disclosure. Point prediction is used to estimate pixel values in order to efficiently encode them during image compression.

Natural Image Point Prediction uses high order statistics to estimate pixel values, and it directly measures these statistics from natural images with no restrictive assumptions about underlying structure of images. Other methods either restrict their measurements to first and second order statistics, or they use models that make overly restrictive assumptions about the underlying structure of images. Provided herein are solutions to the problem of estimating original image pixel values given a digitized array of image pixel values.

Because natural image point prediction does not make the same assumptions as existing upsampling, interpolation and denoising methods, it is able to gain more insight into the structure of natural images and be more accurate, simpler and more direct than existing methods and therefore computationally more efficient than existing methods.

This invention may be used in conjunction with existing methods. For example, it can be used in conjunction with JPEG encoding for better JPEG encoding, it can be used in conjunction with almost any other interpolation method. Many digital image processing methods cannot be fruitfully combined with other methods.

In some embodiments, the lookup tables used in the methods provide here are replaced with smooth functions fitted to the tables, resulting in substantially lower memory requirements.

In some embodiments, the methods herein provide an improved solution to the problem of estimating original image pixel values given a digitized array of image pixel values. This may be accomplished by first measuring, with a novel direct technique, the average local statistics in space and/or time of natural images captured with an arbitrary image-capture device of interest, such as a digital camera. These statistics are used to create look-up tables that provide optimal Bayesian estimates of point (pixel) values.

The method may be tailored to specific classes of image-capture device and image processing tasks, for improved performance. The method provides statistically optimal estimates given the local image properties considered, which guarantees better accuracy than all other methods that use those properties. The implementation only involves look up tables which allows good real time performance. The tables can be approximated with smooth functions to reduce storage.

In some embodiments, the methods provided herein are substantially faster and more accurate than standard methods.

An important general consideration is that denoising methods are almost always tested by adding constant-variance white Gaussian noise (AWGN) to gamma-compressed ground truth images. However, the noise in most digital cameras is more complex. The noise in the raw image from a CCD or CMOS sensor array is generally statistically independent and multiplicative: the variance of the noise is proportional to the mean intensity falling on the pixel. This noise occurs prior to gamma compression, and thus differs from additive noise following gamma compression. Note, however, that additive noise following gamma compression is similar to multiplicative noise prior to gamma compression, explaining in part the popularity of AWGN. Further, the digital camera noise becomes spatially correlated after the standard image processing in the camera's hardware or firmware, which typically involves color interpolation (demosaicing) and conversion to a standard display format such as sRGB. Thus, even a "lossless" tiff or png camera image contains spatially correlated noise. It is quite possible that methods that work well for AWGN will perform more poorly on noisy digital camera images. Therefore, both for training and testing denoising methods it is critical to consider the actual noise in digital cameras (Liu C., Szeliski R., Kang, S. B., Zitnick C. L. & Freeman W. T. (2008), Automatic estimation and removal of noise from a single image; *IEEE Trans. Pattern Anal. & Mach. Intell.* 30, 299-314; Danielyan A., Vehvilanien M., Foi A., Katkovnik V. & Egiazarian K. (2009) *Proc. Local and Non-Local Approx. in Image Process.* 125-129.).

In what follows the noise in a high quality digital camera is first measured and characterized. This camera noise model is then used to simulate the effects of the camera's noise by adding model noise to a large set of ground-truth images to obtain training and test images. Next, details of RCM denoising are described. Finally, RCM denoising with other methods are compared, both in terms of mean squared error (MSE/PSNR) and subjective appearance.

Noise Measurements

Noise was measured in a Nikon D700 camera. Images were captured of a fixed uniform light field created from a tungsten light source. The shutter speed was set at 1/60 sec. The camera's aperture was adjusted in small increments so that images varied from completely black fields to maximally white fields. Measurements were repeated for a range of ISO settings: 200, 400, 640, 800, 1000, and 3200. Note that ISO represents the gain applied to CCD/CMOS elements, and thus the greater the ISO, the noisier the images. Higher ISO values are typically needed for low light levels or for stop-action (fast shutter speeds).

With reference now to FIG. 1, a noise model fit for 14-bit flat-field red pixel image with mean value of 89.5 is shown. A Gaussian noise model does not fit well when the image pixel values are low because of the higher kurtosis of the image's noise distribution. A mixture of a Gaussian and Laplace distribution provides a better fit.

Statistical analysis was carried out separately for the R, G, and B pixel locations in the 14-bit raw images. In order to control for the effect of vignetting, only the center 128×128 patch of pixels from each image was analyzed. FIG. 1 shows the distribution of R pixel values for one ISO and aperture setting. The distributions often differ slightly from Gaussian and are better described by a mixture of a Gaussian (normal) and a Laplace distribution (black curve in FIG. 1):

$$|f(z) = \alpha \frac{1}{\sqrt{2\pi}\,\sigma_N} e^{-\frac{(z-\bar{z})^2}{2\sigma_N^2}} + (1-\alpha)\frac{1}{2\sigma_L^2} e^{-\frac{|z-\bar{z}|}{\sigma_L^2}} \quad (3)$$

Figure 2:
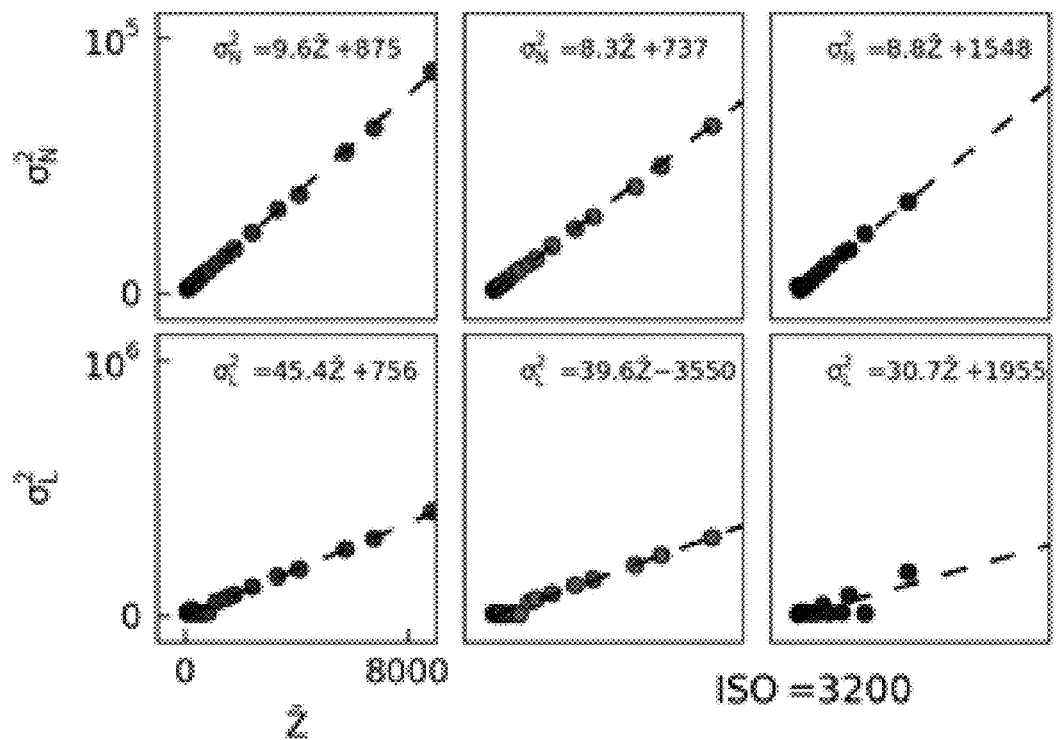
FIG. 2 shows measured variances of Gaussian and Laplace distributions from flat field images.

Each measured distribution was fitted with this mixture function. FIG. 2 plots the fitted variance parameters as a function of the mean pixel value, for R, G and B pixels, at $ISO_{3200}$. As can be seen, the variances increase approximately linearly. We used the best fitting linear functions to summarize the camera noise for each ISO setting. The camera noise increases with the ISO setting, and thus the plots in FIG. 2 show the highest measured noise levels.

As a check, the measurements were repeated with a shutter speed of 1/250 s (and larger aperture). As expected, the noise parameters were independent of the shutter speed.

With reference now to FIG. 2, measured variances of Gaussian and Laplace distributions from flat field images are shown. The measurements were summarized with linear equations.

Noise Simulation $ISO_{200}$ is the lowest standard ISO setting (low noise) available in the D700 camera; thus, natural images captured with this ISO were taken to be ground truth images. Training and test images for higher ISO settings were then created by adding simulated camera noise. In particular, for any value $\bar{z}$ in the ground truth image a random value $\Delta Z$ given by $$\Delta z = \begin{cases} \Delta \sigma_N(\bar{z}) \times N, & \text{if } U < \alpha \\ \Delta \sigma_L(\bar{z}) \times L, & \text{otherwise} \end{cases} \quad (4)$$

was added, where U is a random sample from a uniform distribution, N is a random sample from a standard normal distribution, L is a random sample from a standard Laplace distribution, and $$\Delta \sigma_N(\bar{z}) = \sqrt{\sigma_N^2(\bar{z};ISO_T) - \sigma_N^2(\bar{z};ISO_{200})}$$

$$\Delta \sigma_L(\bar{z}) = \sqrt{\sigma_L^2(\bar{z};ISO_T) - \sigma_L^2(\bar{z};ISO_{200})} \quad (5)$$

The value of $\alpha$ was determined by averaging the value of $\alpha$ for all fits across all channels. The average value of $\alpha$ was 0.975, and the standard deviation of $\alpha$ was 0.027.

The variance of the simulated noise increases in proportion to the mean value and hence is "multiplicative" noise. Further, the simulated noise is generated independently for each pixel location. Because the noise is approximately Gaussian, the simulated noise in raw images is referred to as multiplicative white Gaussian noise (MWGN).

The above steps simulate the noise in raw images, but most applications involve denoising images that have been interpolated (demosaiced), converted to a standard color format (usually linear sRGB), gamma compressed, and finally quantized to 8-bits per color channel (24-bit sRGB). These cases can be simulated simply by processing the raw ground truth and the simulated raw test/training images through the standard processing steps (Liu C., Szeliski R., Kang, S. B., Zitnick C. L. & Freeman W. T. (2008) Automatic estimation and removal of noise from a single image. *IEEE Trans. Pattern Anal. & Mach. Intell.* 30, 299-314). For example, FIG. 3a shows a cropped region from an $ISO_{200}$ raw image, after conversion to standard 24-bit sRGB. FIG. 3b shows a cropped image of the same scene taken at $ISO_{3200}$. FIG. 3c shows the result of adding simulated noise to the $ISO_{200}$ raw image.

Figure 3:
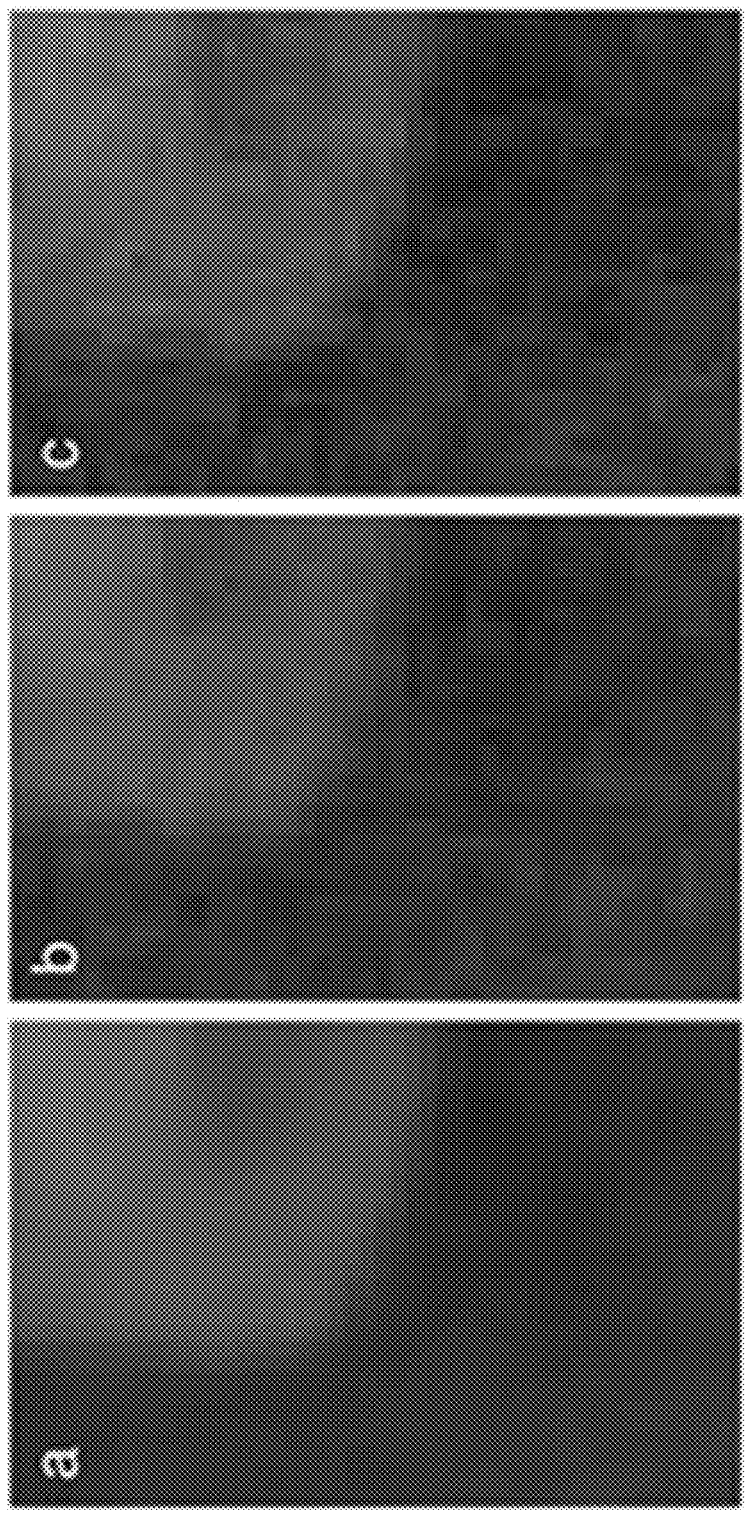
FIG. 3 shows embodiments of synthesized noise.

With reference now to FIG. 3, different noise levels are shown in three images of the same object. The different noise levels shown in the images in FIG. 3, are either created by different camera ISO settings, or to simulate different camera ISO settings. Specifically, FIG. 3(a), shows a cropped region of an image taken with camera $ISO_{200}$, FIG. 3(b), shows the cropped region of the image taken with camera $ISO_{3200}$, and FIG. 3(c) shows the cropped region of the image with noise added to create a synthesized $ISO_{3200}$ image.

Figure 4:
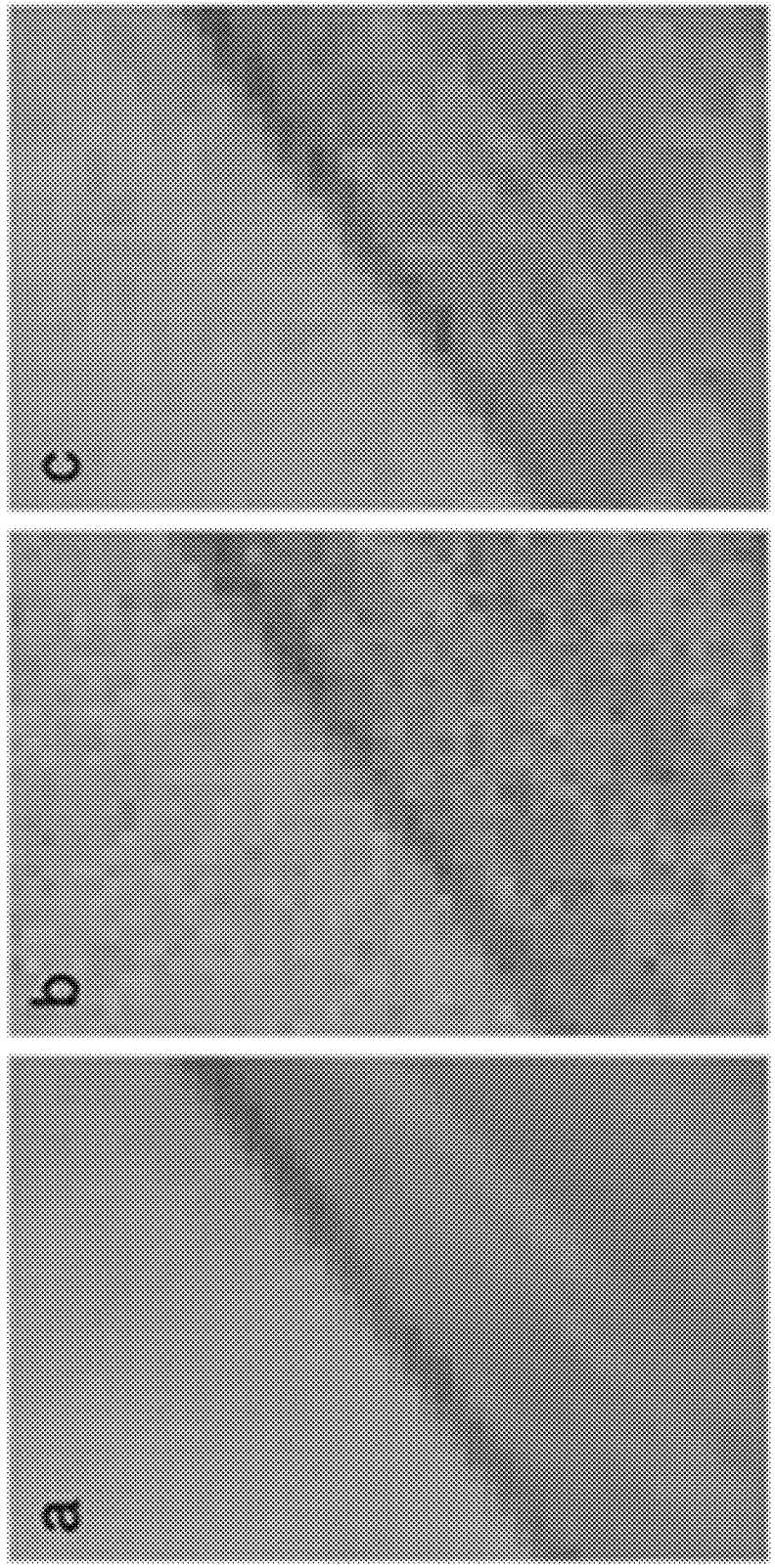
FIG. 4 shows a comparison of ISO noise with traditional AWGN (additive white Gaussian noise).

The noise in the real and simulated sRGB images is clearly spatially correlated. We will call this multiplicative correlated Gaussian noise (MCGN). FIG. 4 compares the synthesized noise in a sRGB camera image with that of standard additive white Gaussian noise (AWGN) of similar noise power. Note that the white noise was (as is standard) added after gamma compression. The RCM method of denoising can be applied to any kind of noise. The emphasis here is on denoising sRGB images (MCGN), but the present also considers multiplicative and additive white Gaussian noise (MWGN and AWGN).

RCM DENOISING

Recursive Conditional Means and Variances

As mentioned earlier, the key concept of RCM denoising is to measure conditional means for different local contexts. As referred to herein, a conditional mean refers to a single conditional average and conditional means refers to a plurality of conditional averages. The conditional mean for each context provides the Bayes optimal (MMSE) estimate given that context. The number of variables constituting each local context is chosen to be small so that the conditional means can be measured accurately from training images without making assumptions about the underlying probability distributions. By measuring and applying the conditional means recursively the effective size of the context is expanded.

With reference now to FIG. 4, synthesized ISO noise versus traditional AWGN (additive white Gaussian noise) is shown in three images of the same object. FIG. 4(a) shows the original image of the object, FIG. 4(b) shows the same image with synthesized AWGN, MSE across entire image=55.8, and FIG. 4(c) shows the same image with synthesized MCGN (ISO3200), MSE across entire image=56.3.

To be more precise, let $z_0(x)$ represent the input image, let $c_{i-1}(x)$ be the context vector used to obtain the $i^{th}$ recursively estimated image $z_i(x)$, and let $z(x)$ represent the ground truth image. Thus, the Bayes optimal estimate of $z(x)$ on iteration i is given by $$z_i(x) = E[z(x)|c_{i-1}(x)] \quad (6)$$

where the context vector on iteration i is obtained from image $z_{i-1}(x)$. The number of iterations n is set based on when the estimation accuracy reaches asymptote.

For symmetry, images can also be estimated with all the context vectors rotated by 90 deg. This slows the computation speed, but does not result in estimating additional tables. This second set of estimated images can be written as $$z_i^\perp(x) = |E[z(x)|c_{i-1}^\perp(x)] \quad (7)$$

The last estimated images, $z_n(x)$ and $z_n^i(x)$, can be combined using their reliabilities:

$$z_n^*(x) = \frac{v_n(x)z_n(x) + r_n^\perp(x)z_n^\perp(x) - ru}{v_n(x) + r_n^\perp(x) - r} \quad (8)$$

where $u = E[z(x)]$, $r_n(x) = 1/\text{Var}[z(x) | c_{n-1}(x)]$, and $r_n^\perp(x) = 1/\text{Var}[z(x) | c_{n-1}^\perp(x)]$, and $r = 1/\text{Var}[z(x)]$ Note that if the reliabilities of the two estimates are approximately equal and are much larger than r, then equation (8) reduces to the simple average:

$$z_n^*(x) = \frac{z_n(x) + z_n^\perp(x)}{2} \quad (9)$$

Derivation of Rule Used for Combining Multiple Estimates of the True Pixel Value As discussed above, in some embodiments, multiple estimates of the true pixel value can be combined into this last. Derivation of the rule used for combining multiple estimates of the true pixel value z into a single estimate is shown here. This rule is optimal given certain assumptions, and is closely related to standard rules for cue combination (Oruc, I., Maloney, L. T., & Landy, M. S. (2003), Weighted linear cue combination with possibly correlated error, *Vision Research*, 43, 2451-2468). Let $c_1, \ldots, c_n$ represent n sets of known pixel values (sources of information) that are to be used in estimating a single unknown pixel value z. Using Bayes' rule, the posterior probability of z given the known pixel values can be written as:

$$p(z \mid c_1, \ldots, c_n) = \frac{p(c_1, \ldots, c_n \mid z) p(z)}{p(c_1, \ldots, c_n)} \tag{A1}$$

The first assumption is that given the true value of z, $c_i$ is independent of $c_j$ for all i and j (i.e., the sources of information are statistically independent). In this case, this results in $$p(x \mid c_1, \ldots, c_n) = \frac{p(z) \prod_{i=1}^{n} p(c_i \mid z)}{p(c_1, \ldots, c_n)} \tag{A2}$$

Applying Bayes' rule again, $$p(z \mid c_1, \ldots, c_n) = \frac{\prod_{i=1}^{n} p(z \mid c_i)}{p^{n-1}(z)} \frac{\prod_{i=1}^{n} p(c_i)}{p(c_1, \ldots, c_n)} \tag{A3}$$

or, $$p(z \mid c_1, \ldots, c_n) = K_e \frac{\prod_{i=1}^{n} p(z \mid c_i)}{p^{n-1}(z)}$$

where $$K_c = \frac{\prod_{i=1}^{n} p(c_i)}{p(c_1, \ldots, c_n)}$$

The second assumption is that the prior and posterior probability distributions are Gaussian. In this case, this results in $$p(z \mid c_1, \ldots, c_n) = \frac{K_c \exp\left(\sum_{i=1}^{n} -0.5(z-u_i)^2 r_i\right) \prod_{i=1}^{n} \frac{\sqrt{r_i}}{\sqrt{2\pi}}}{\exp\left(\sum_{i=1}^{n-1} -0.5(z-u)^2 r\right) \prod_{i=1}^{n-1} \frac{\sqrt{r}}{\sqrt{2\pi}}} \tag{A4}$$

where $\mu_i$ and $\rho_i$ are the conditional mean and reliability of posterior probability distribution of z given $c_i$, and u and r are the mean and reliability of the prior probability distribution of z. (Note that reliability is the inverse of the variance.) Rearranging, gives $$p(z \mid c_1, \ldots, c_n) =$$

$$\frac{K_c \prod_{i=1}^{n} \frac{\sqrt{y_i}}{\sqrt{2\pi}}}{\prod_{i=1}^{n-1} \frac{\sqrt{r}}{\sqrt{2\pi}}} \exp\left(0.5(n-1)(z-u)^2 r - 0.5 \sum_{i=1}^{n} (z-u_i)^2 r_i\right)$$

Consider the term inside the exponential. Because this term is quadratic in z it follows that $p(z \mid c_1, \ldots, c_n)$ is Gaussian. Expanding, collecting terms, and completing the square, shows that $p(z \mid c_1, \ldots, c_n)$ is the form:

$$p(x \mid c_1, \ldots, c_n) = \tag{A5}$$

$$K \exp\left(-0.5\left(-(n-1)r + \sum_{i=1}^{n} r_i\right)\left[z - \frac{\left(-(n-1)ru + \sum_{i=1}^{n} r_i u_i\right)}{\left(-(n-1)r + \sum_{i=1}^{n} r_i\right)}\right]^2\right)$$

where K is the constant that makes the right side of the equation a probability distribution.

The minimum mean squared error (MSSE) estimate is the expected value of the posterior probability distribution, and the maximum a posteriori (MAP) estimate is the mode of the posterior probability distribution. It follows from eq. (A5) that the MMSE and MAP estimates are the same and are given by $$\hat{z} = \frac{\left(ru + \sum_{i=1}^{n} (r_i u_i - ru)\right)}{\left(r + \sum_{i=1}^{n} (r_i - r)\right)} \tag{A6}$$

Finally, note that the entropy of $p(z \mid c_i)$ can be less than or equal to the entropy of $p(z)$. Thus, $r \leq r_i$, and hence the denominator is always positive.

In using eq. (A6), $u = \bar{z}$ (the sample mean of the prior probability distribution of z), $r = 1/\sigma^2$ (one over the sample variance of the prior probability distribution of z), $u_i = z$ (the sample mean of the posterior probability distribution of z given $c_i$), and $r = 1 1/\sigma_1^2$ (one over the sample variance of the posterior probability distribution of z given $c_i$). Eq. (A6) may not be valid if the two strong assumptions above do not hold, and thus should be regarded as an approximation.

Application of Rule Used for Combining Multiple Estimates of the True Pixel Value As it turned out, for the context vectors used here, the reliabilities are approximately equal and much larger than r; thus, all the results reported here are for equation (9).

To apply this estimation method, one can specify the conditional means, and if it is necessary to combine estimates with equation (8) rather than equation (9), then one can also specify the conditional variances. The approach taken here is to directly measure the conditional means and variances from a large set of training images. Let $\{z(x, 1), \ldots, z(x, k)\}$ be a set of k ground truth images indexed by j, and let $\{z_0(x, 1), \ldots, z_0(x, k)\}$ be the corresponding training images. The sample conditional mean for a specific context vector $c_{i-1}$ is given by $$m_i[c_{i-1}] = \frac{\sum_{(x,j) \in \Omega(c_{i-1})} z(x, j)}{N(c_{i-1})} \tag{10}$$

where $\Omega(c_{i-1})$ is the set of locations in the training images with context $c_{i-1}$, and $N(c_{i-1})$ is the total number of locations in the set. Similarly, the sample variance (if needed) is given by $$v_i[c_{i-1}] = \frac{\sum_{(x,j)\in\Omega(c_{i-1})} z^2(x,j)}{N(c_{i-1})} - m_i^2[c_{i-1}]. \quad (11)$$

The values of $m_i[c_{i-1}]$ and $v_i[c_{i-1}]$ can be stored as tables (as done here), or potentially summarized with descriptive functions. If the set of training images is sufficiently large, then $E[z(x)|c_{i-1}(x)] \cong m_i[c_{i-1}(x)]$ and $Var[z(x)|c_{i-1}(x)] \cong v_i[c_{i-1}(x)]$. In practice, it is generally found that the tables are the same for the rotated context vectors, and hence $E[z(x)|c_{i-1}(x)] \cong m_i[c_{i-1}(x)]$ and $Var[z(x)|c_{i-1}^{-1}(x)] \cong v_i[c_{i-1}^{-1}(x)]$.

Ground Truth, Training and Test Images

The ground truth, training, and test images were obtained from a database of 1204 high resolution (4284×2844) 14-bit raw images captured with a calibrated Nikon D700 digital camera, at its lowest standard ISO setting ($ISO_{200}$). Care was taken to minimize clipping. From the 1204 images, 803 were randomly selected to be training images, and the remaining 401 were used as test images. The 803 training images provided approximately $10^{10}$ samples for learning each table of conditional means.

We considered three kinds of training and test images. For the first kind (MCGN), the following sequence of steps were performed: (1) addition of simulated camera noise ($ISO_{3200}$) to ground truth raw images, (2) AHD interpolation (demosaicing), (3) conversion to linear sRGB, (4) gamma compression, (5) quantization to 24-bit (8 bits per channel) sRGB. For the second kind (MWGN) the steps were: (1) AHD interpolation, (2) conversion to linear sRGB, (3) addition of MWGN, (4) gamma compression, (5) quantization to 24-bit sRGB. For the third kind (AWGN) the steps were: (1) AHD interpolation, (2) conversion to linear sRGB, (3) gamma compression, (4) quantization to 24-bit sRGB, (5) addition of AWGN. The average noise power (mean squared error from the ground truth images) for the second and third kinds of images was set to match that of the first kind For more details about the natural images see, e.g., Geisler, W. S., & Perry, J. S. (2011), Statistics for optimal point prediction in natural images, *Journal of Vision,* 11(12):14, 1-17, doi:10.1167/11.12.14, where all the ground truth images are available.

Context Vectors

Once the ground truth and training images have been specified, the only remaining steps are to specify the context vectors and measure the tables. In RCM denoising, all context vectors consist of three 8-bit variables.

For gray scale images there are five context vectors:

$c_0(x) = [z_0(x-1,y), z_0(x,y), z_0(x+1,y)]$ $c_1(x) = [z_1(x,y-1), z_1(x,y), z_1(x,y-1)]$ $c_2(x) = [z_2(x-1,y), z_2(x,y), z_2(x+1,y)]$ $c_3(x) = [z_3(x,y-1), z_3(x,y), z_3(x,y+1)]$ $c_4(x) = [z_4(x), a_4(x), \sigma_4(x)] \quad (12)$ The first four contexts consist of the pixel location being estimated and two immediately neighboring pixel locations. The contexts alternate between the horizontal and vertical directions. As a result of applying tables for these contexts recursively, there are effectively 9 pixels in $z_0(x)$ (the 3×3 neighborhood) that contribute to each estimated pixel in $z_2(x)$, and 25 pixels (the 5×5 neighborhood) contributing to each estimated pixel in $z_4(x)$ (see FIG. 5). Tables for these first four context vectors can be applied very efficiently—they are effectively 1×3 contexts that can be applied successively to the image, in place, with minimal buffering.

The final context vector consists of the pixel location being estimated, the average $a_4(x)$ of the values in the surrounding 9×9 neighborhood of pixel locations (80 locations), and the standard deviation $\sigma_4(x)$ of the surrounding 80 pixel values from the regression plane. The rationale for this last context vector is that if the ground truth image is locally planar at some location, then the MMSE estimate is the average of the values in the neighborhood. The standard deviation from the regression plane measures how close the neighborhood is to being planar, allowing the table to know when to put the most weight on the local average.

Formulas Used for Planar Regression

The formulas used for planar regression are provided here. The equation of a plane is $f(x,y) = Ax + By + C$. Consider a square block of pixels of odd dimension n, where the center pixel is taken to be the origin. The least squares estimates of the parameters of the plane are $$A = \frac{\sum_{x,y} z(x,y)x}{k}, \quad (B1)$$

$$B = \frac{\sum_{x,y} z(x,y)y}{k},$$

$$C = \frac{\sum_{x,y} z(x,y)}{n^2}$$

Where, $$k = \frac{n^2}{3}\left(\frac{n-1}{2}\right)\left(\frac{n-1}{2}+1\right) \quad (B2)$$

The standard deviation from the best fitting plane is given by $$\sigma = \sqrt{\frac{1}{n^2}\sum_{x,y}[Ax + By + C - z(x,y)]^2} \quad (B3)$$

Denoising Contexts

Figure 5:
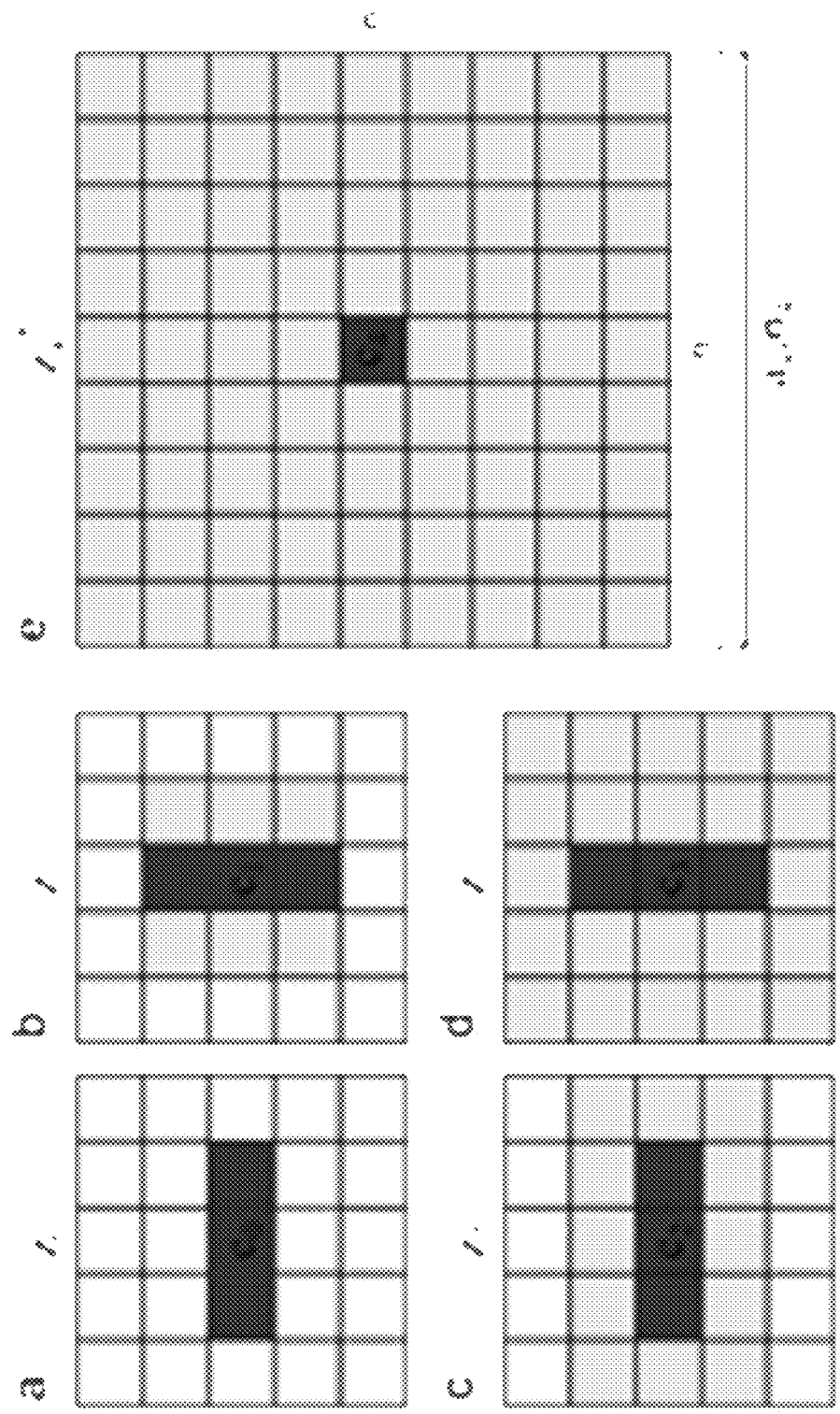
FIG. 5 shows the noising contexts used in connection with a denoising algorithm.

With reference now to FIG. 5, one embodiment of denoising contexts are shown. The input image is $z_0$, and the recursively estimated images are $z_1$ to $z_5$. (a)-(d) The black pixels show the explicit context vector used from that image to obtain the next image. The grading pixels show the additional pixels effectively contributing to the estimate. (e) The context for estimating $z_5$ consists of the center (black) pixel, the average of the surrounding (Ray) pixels, $a_4$, and the standard deviation of those pixels from the regression plane, $\sigma_4$.

For color images, the algorithm first converts the images from RGB to a perceptual color space (e.g., Rec 709 YCbCr, or a simple opponent color space (see, e.g., K. Dabov, A. Foi, V. Katkovnik, and K. Egiazarian (2007), Image denoising by sparse 3D transform-domain collaborative filtering, *IEEE Trans. Image Process.,* 16, pp. 2080-2095), applies the tables, and then converts back to RGB. Converting to a perceptual color space significantly reduces visible color artifacts in the denoised images. Perceptual color spaces represent each pixel with a luminance value (e.g., Y) and two color-opponent values (e.g., Cb, Cr). Using the same context vectors described above, one set of tables for the luminance values is learned and another set for the color-opponent values is learned (the same tables are used for both color-opponent values). For the color-opponent channels, the fifth context vector uses an 11×11 neighborhood rather than 9×9. For color images, the algorithm also uses a final context vector consisting of the estimated RGB values in $z_5(x)$:

$$c_5(x) = [R_5(x), G_5(x), B_5(x)] \tag{13}$$

RESULTS

Estimation Tables

RCM denoising uses local contexts having only three elements. This makes it possible to visualize the statistical rules implicit in the MMSE estimates. For example, FIG. 6a-c shows the optimal estimates for context $c_0$ (see FIG. 5a). In each plot, the horizontal and vertical axes give the values of the two context pixels surrounding the center context pixel (the location being denoised). The color scale gives the MMSE estimate of the gray level of the center pixel (i.e., the directly measured conditional mean). The upper plot is for when the value of the center context pixel is 64, the middle plot when the value is 128, and the bottom plot when the value is 192. In general, the MMSE estimates are smooth but non-trivial functions of the context vector. When the surrounding context pixels are nearly equal (i.e., near the main diagonal) and are lower in value than the center context pixel, then the estimate is strongly reduced. Similarly when the surrounding context pixels are nearly equal and greater than the center context pixel, then the estimate is strongly increased. On the other hand, when the two surrounding pixels differ there is greatly likelihood of structure in the ground truth image and hence more weight is put on the center context pixel. The tables for contexts $c_1$ to $c_3$ are qualitatively similar to that for $c_0$ but differ in detail.

Figure 6:
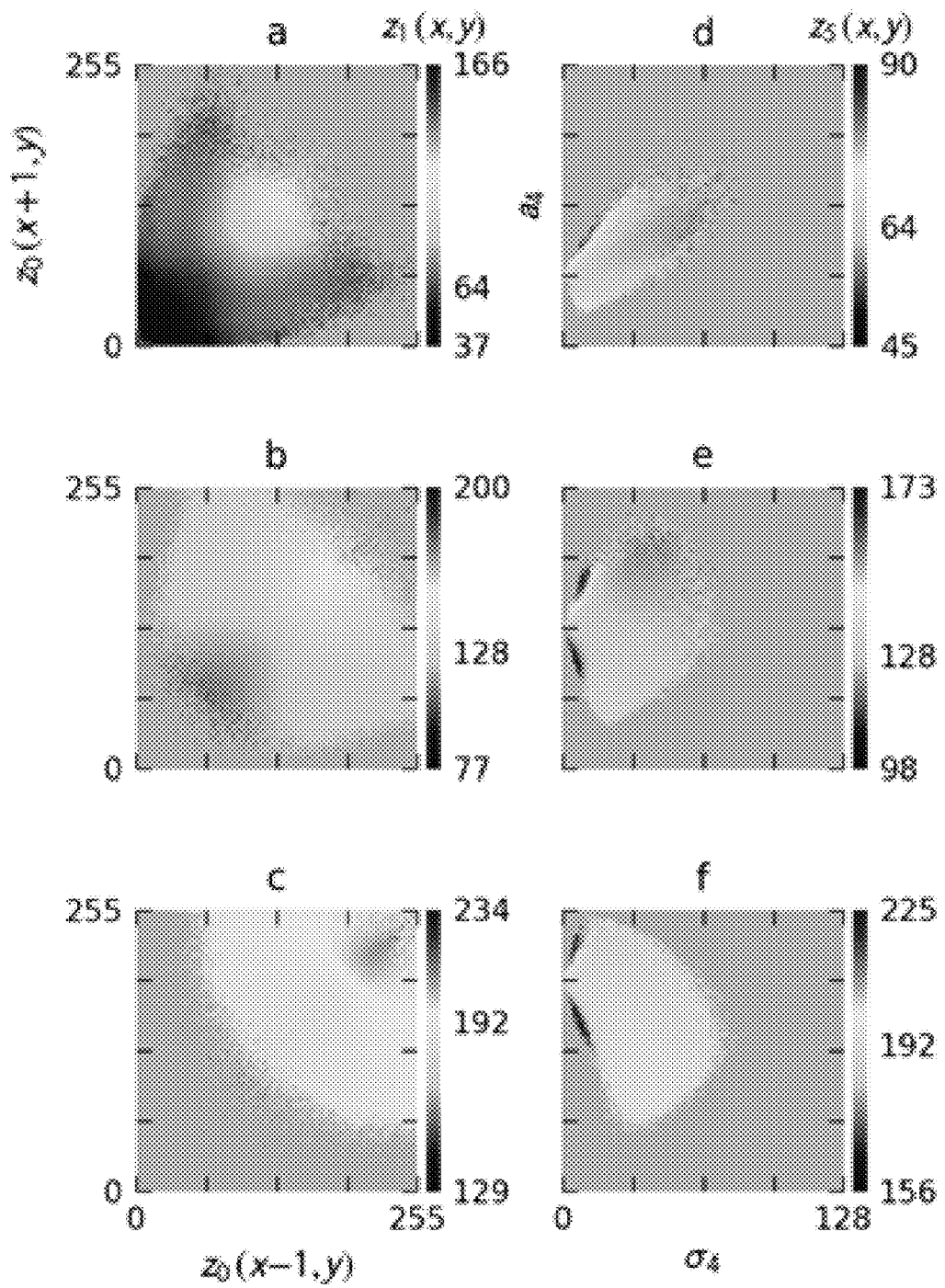
FIG. 6 shows one embodiment of estimation tables for use with a denoising algorithm.

With reference now to FIG. 6, estimation tables for RCM denoising are shown. Horizontal and vertical axes give the two context variables that are not the center context pixel. The color axis gives the MMSE estimate. (a-c) Tables for context $c_o$ when the center context pixel $z_0(x,y)$ has a value of (a) 64, (b) 128, and (c) 192. (d-f) Tables for context $c_4$ when center context pixel $z_4(x,y)$ has a value of (d) 64, (e) 128, and (f) 192.

FIG. 6d-f shows the optimal estimates for context $c_4$ (see FIG. 5e). In each plot, the vertical axis gives the average gray level of the context pixels surrounding the center pixel (the pixel location being estimated), and the horizontal axis gives the standard deviation of the context pixel values from the regression plane. Again, the upper, middle, and lower plots are for when the value of center context pixel is 64, 128, and 192, respectively. When the standard deviation is low, the region is closer to planar and more weight is put on the average (the estimates change more as the average changes; note the bigger changes in color), whereas when the standard deviation is high the region is less planar and more weight is put on the center context pixel (the estimated value from the previous contexts).

Quantitative Performance

To assess the performance of RCM denoising, it was compared with two standard algorithms, adaptive Wiener filtering (AWF; using the MATLAB® R2102a wiener2 function) and ImageMagick® adaptive blur (IMAB; www.imagemagick.org, version 6.7), and with a state-of-the-art algorithm (C-BM3D (see, e.g., K. Dabov, A. Foi, V. Katkovnik, and K. Egiazarian (2007), Image denoising by sparse 3D transform-domain collaborative filtering, *IEEE Trans. Image Process.*, 16, pp. 2080-2095)). Three different kinds of noise were tested: multiplicative correlated Gaussian noise (MCGN; i.e., realistic camera-image noise), multiplicative white Gaussian noise (MWGN; i.e., realistic raw-camera-image noise), and additive white Gaussian noise (AWGN). The MGCN corresponded to the noise in a Nikon D700 camera at $ISO_{3200}$ (see FIGS. 2 and 3). The MWGN and AWGN were set to have the same average noise power as the camera-image noise (MCGN). This noise level corresponded to $\sigma=13.21$ for AWGN. This was the value of the noise parameter given to the three comparison algorithms.

Figure 7:
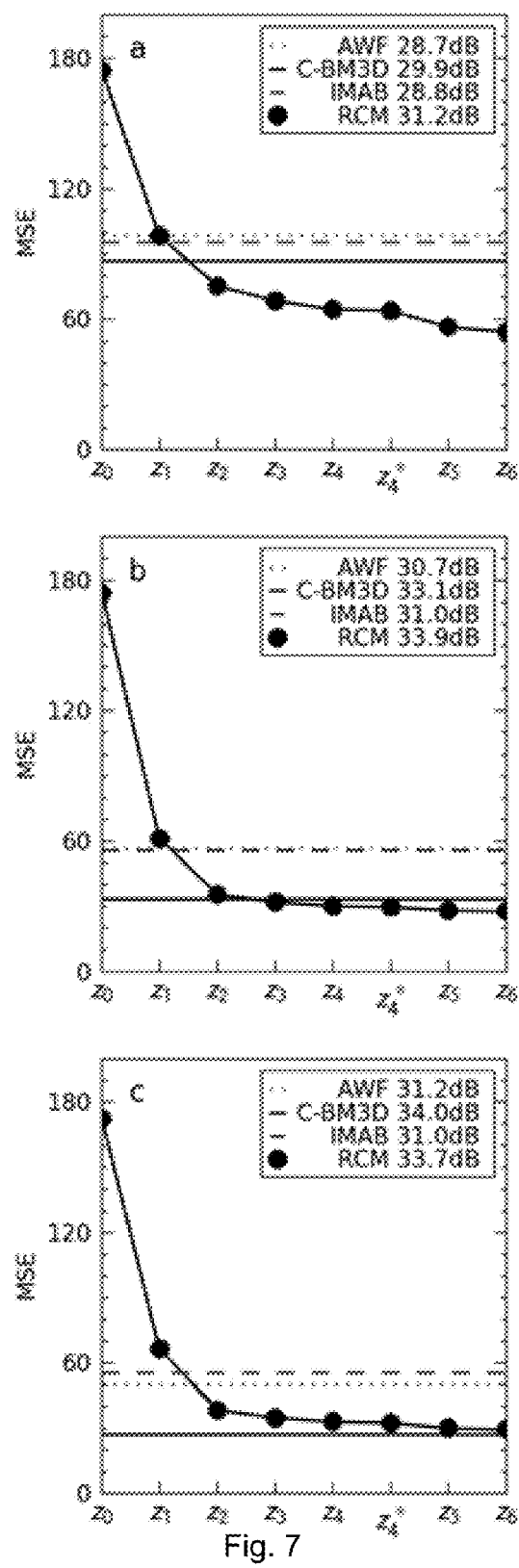
FIG. 7 illustrates the quantitative performance of denoising algorithms on 401 RGB test images.

Performance was compared on the 401 test RGB images and on several standard RGB images in the image processing literature. The black circles in FIG. 7 show the average MSE for the 401 test images after each step of RCM denoising. Recall that the result of applying the table for each context is a partially denoised image (indicated on the horizontal axis). The horizontal lines show the average MSE of the comparison algorithms. Also shown in the Fig is the average PSNR of the final estimates.

With reference now to FIG. 7, the quantitative performance of denoising algorithms on 401 RGB test images is shown. The vertical axis gives the average MSE of the denoised image. The horizontal axis indicates the successively denoised images produced by the proposed RCM algorithm. The black circles show the MSE of the successively denoised images by the RCM algorithm. The colored horizontal lines show the final MSE of the comparison algorithms. Also shown are the average final values of PSNR. (a) Results for realistic camera-image noise (MCGN). (b) Results for realistic raw-camera-image noise (MWGN). (c) Results for additive white Gaussian noise (AWGN).

FIG. 7a shows the results for noise that realistically mimics the noise in camera images (MCGN). The MSE drops rapidly as the successive tables are applied, dropping down to that of the AWF and IMAB algorithms after 1 step and below that of C-BM3D after 2 steps. FIG. 7b shows the results for noise that realistically mimics the noise in raw camera images (MWGN). Again, the MSE drops rapidly as the successive tables are applied, dropping below that of AWF and IMAB after 2 steps and below that of C-BM3D after 3 steps. Finally, FIG. 7c shows the results for additive white noise (AWGN). The MSE drops below AWF and IMAB at 2 steps and approaches but does not drop below C-BM3D. Denoising is generally easier with statistically independent noise and hence the final MSE is lower for MWGN and AWGN.

Figure 8:
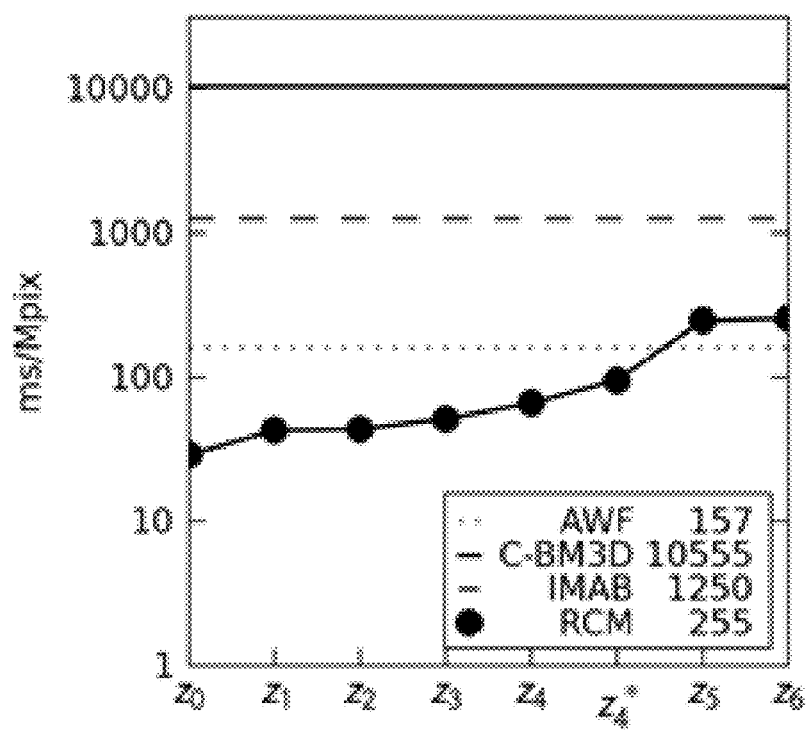
FIG. 8 illustrates the computational time of different invoicing algorithms.

The black circles in FIG. 8 show the cumulative computation time in milliseconds per megapixel, at each successive step of the RCM algorithm. The final black circle and the horizontal lines show the total computation time of the algorithms. The algorithms were run on a single 3.1 GHz Intel processor. Not surprisingly, given its simplicity and its use of tables, the RCM algorithm runs very quickly. The slowest step is application of the table for context $c_4$ (see FIG. 5e). The next slowest step is repeating the first four steps with the orthogonal context vectors to obtain $z_4^\perp$. Interestingly, this step provides symmetry (which is good to have), but has a relatively minor effect on MSE (see FIG. 7). Thus under demanding conditions it could be dropped.

With reference now to FIG. 8, the computation time of denoising algorithms is shown. As seen in FIG. 8, the RCM algorithm outperforms the denoising algorithms for iterations up to $z_5$.

Qualitative Performance

Figure 9:
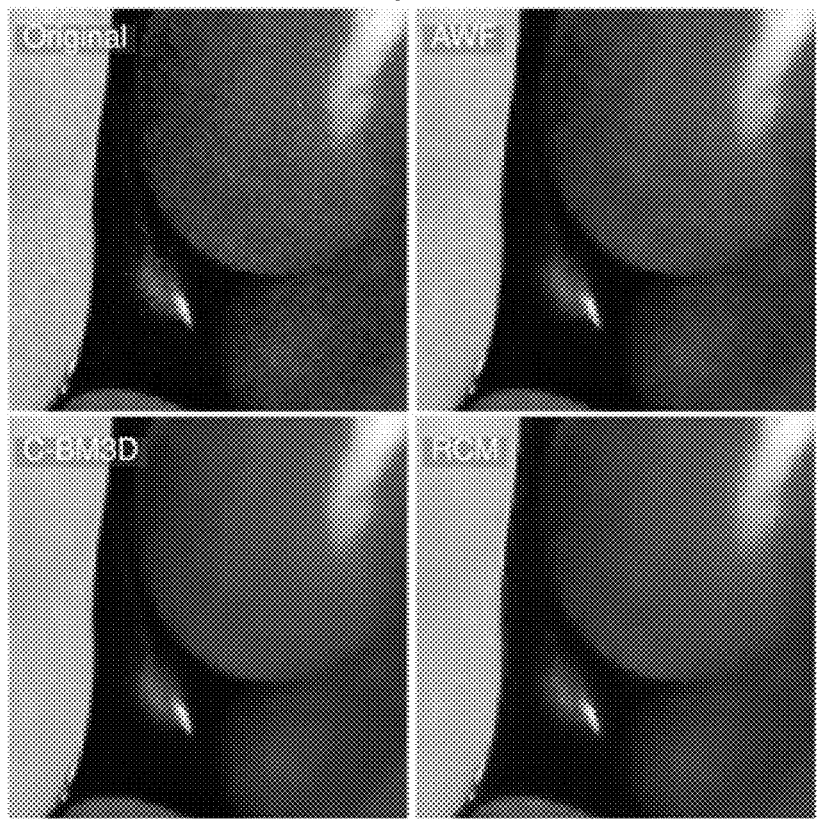
FIG. 9 shows one embodiment of a cropped region of the original standard peppers image together with result of AWF, C-BM3D, and RCM algorithms.

Many of the standard test images in the image processing literature already contain substantial camera noise and thus one way to compare denoising algorithms is simply to denoise the original image. For example, FIG. 9 shows a cropped region of the original standard peppers image together with the results of the AWF, C-BM3D and RCM algorithms. Qualitatively the quality of C-BM3D and RCM are similar with a little less chromatic aliasing for the RCM algorithm.

Figure 10:
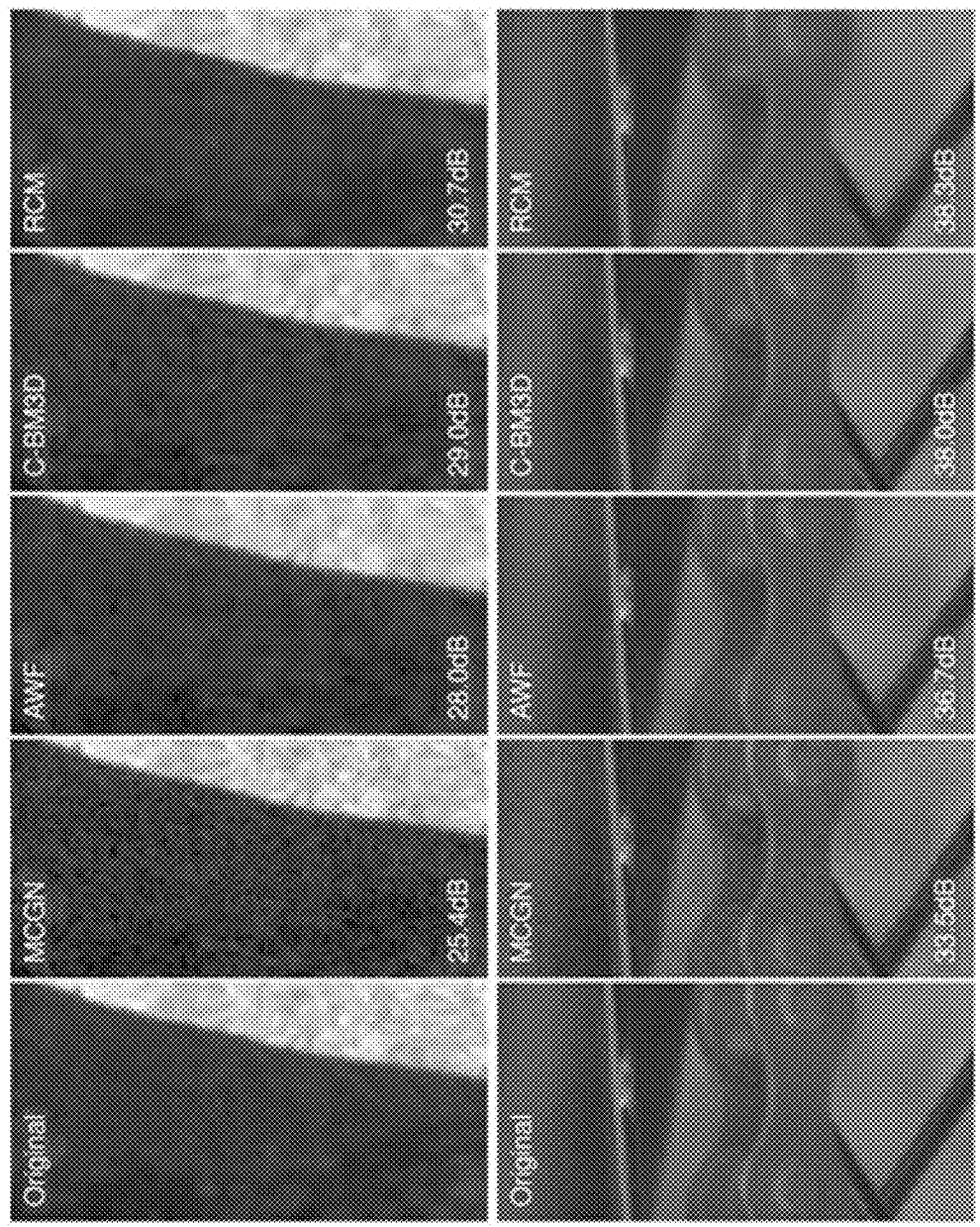
FIG. 10 depicts results of different algorithms from images containing additional multiplicative correlated Gaussian noise.

With reference now to FIG. 10, details of results from various algorithms from images containing additional multiplicative correlated Gaussian noise portion. The top image is from a natural scene taken from the CPS natural image database. The bottom image is not a natural scene and is not contained in the database.

FIG. 10 shows results for synthesized camera noise (MCGN). The upper image is cropped from one of the test images in the data set. The bottom image is of a human-made object and not in the data set. The values of PSNR are for the entire image. As can be seen RCM denoising removes much more of correlated spatio-chromatic noise. In the bottom image RCM denoise softens the edges slightly. If desired this effect can be lessened by eliminating or reducing the size of the surround in the context vector $c_4$ (see FIG. 5e), with a minor effect on the MSE (see FIG. 7a). For example, FIG. 11 shows the RCM estimates without context vector $c_4$.

Figure 11:
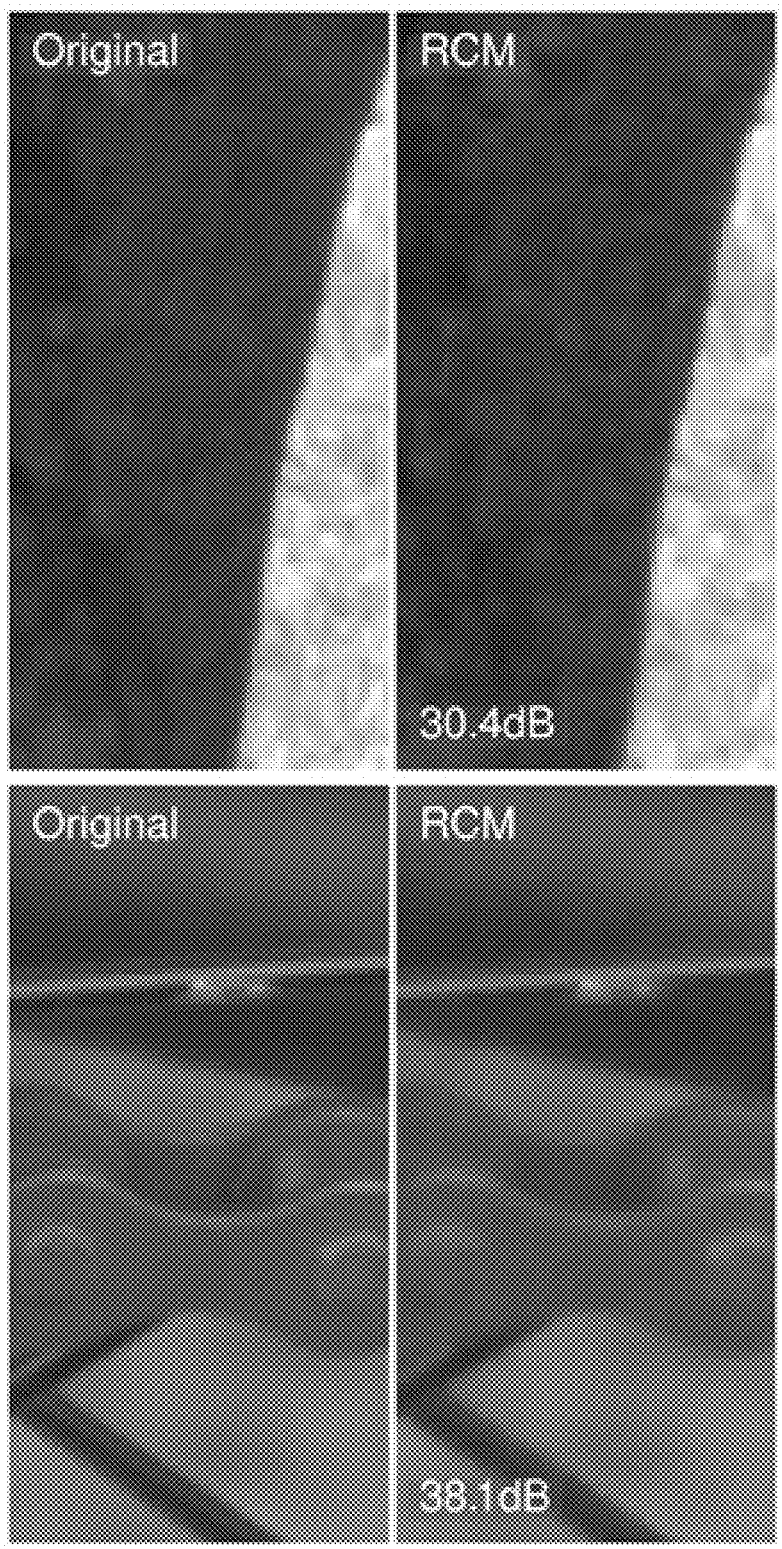
FIG. 11 illustrates the results of the RCM algorithm.

With reference now to FIG. 11, detail of results from RCM algorithm from images containing additional multiplicative correlated Gaussian noise are shown. In these examples, the RCM algorithm was modified to exclude the $5^{th}$ recursive step in which the estimates for $z_5$ are computed using the average and standard deviation from the regression plane.

Figure 12:
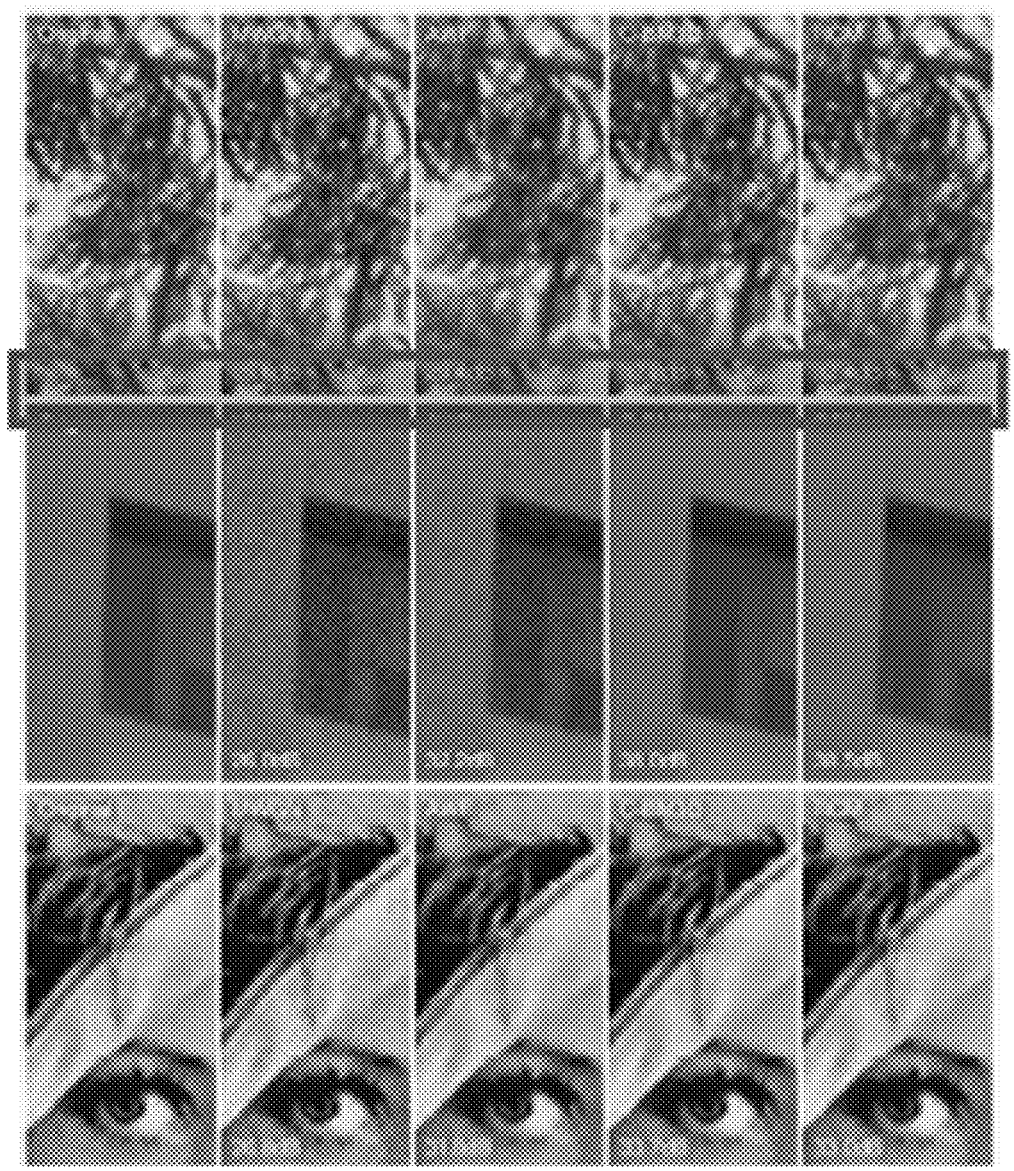
FIG. 12 depicts the results of different algorithms from images containing multiplicative white Gaussian noise.

With reference now to FIG. 12, details of results from various algorithms from images containing additional multiplicative white Gaussian noise are shown. The top image is from a natural scene taken from the CPS natural image database. The middle image is not a natural scene and is not contained in the database. The bottom image is the standard Lena image. The standard deviation of the added noise was 13.21.

FIG. 12 shows results for noise that mimics adding independent multiplicative noise prior to gamma compression (MWGN). Recall that this noise is like the noise in raw camera images and is quite similar to additive independent noise following gamma compression (AWGN). The upper image is cropped from one of the test images in the data set. The middle image contains human made objects and is not in the data set. The bottom image is cropped from the standard Lena image. Again the PSNR values are for the whole image. In general the C-BM3D and RCM results are similar in quality. C-BM3D produces slightly smoother contours (e.g., the contour inside the window of the middle Fig), but removes some image texture (e.g., the brick structure on the left in the middle Fig).

Limitations, Extensions, and Applications

Although RCM denoising is fast and simple computationally, it does use substantial memory to store the fixed tables. The memory requirements are not significant for most personal computers, but may be an issue for image-processing hardware or firmware in devices such as digital cameras. We note, however, that each table is just a list of 8-bit numbers (unsigned bytes) and hence could be stored and retrieved like an image. Also, the tables are relatively smooth and regular (see FIG. 6), and thus it should be possible to closely approximate them in some way; e.g., fitting them with a sum of appropriate basis functions).

As an immediate practical application, RCM denoising can be used to denoise standard 24-bit sRGB images and 8-bit gray scale images. Another obvious application would be the denoising of raw camera images. We have not yet implemented this application, but comparison of FIGS. 7a and 7b suggests that the RCM denoising may be more effective if applied to the raw image, before demosaicing, which creates correlated noise (note the lower final MSE in FIG. 7b). Of course, in many practical situations the raw image is not available.

RCM denoising gets most of its power by measuring very local statistical structure. The output of the 4th recursive step, $z_4$, is quite accurate (FIG. 7), and has a support region of only 5×5 pixels (FIG. 5). Other successful denoising algorithms generally have a larger support region, and thus it is possible that some hybrid approaches could produce better performance, assuming they capture more large scale information than the simple regression-plane measure (FIG. 5e). How much better image denoising can get is a matter of some debate (P. Chatterjee & P. Milanfar (2010) Is denoising dead?, *IEEE Trans. on Image Processing*, 19, 895-911; Levin, A., & Nadler, B. (2011) Natural image denoising: Optimality and inherent bounds. *IEEE Conference and Pattern Recognition and Computer Vision (CVPR)*. 2833-2940). We note, however, that attempts to set bounds on maximum possible denoising performance have assumed AWGN.

Systems for Performing RCM

Figure 13:
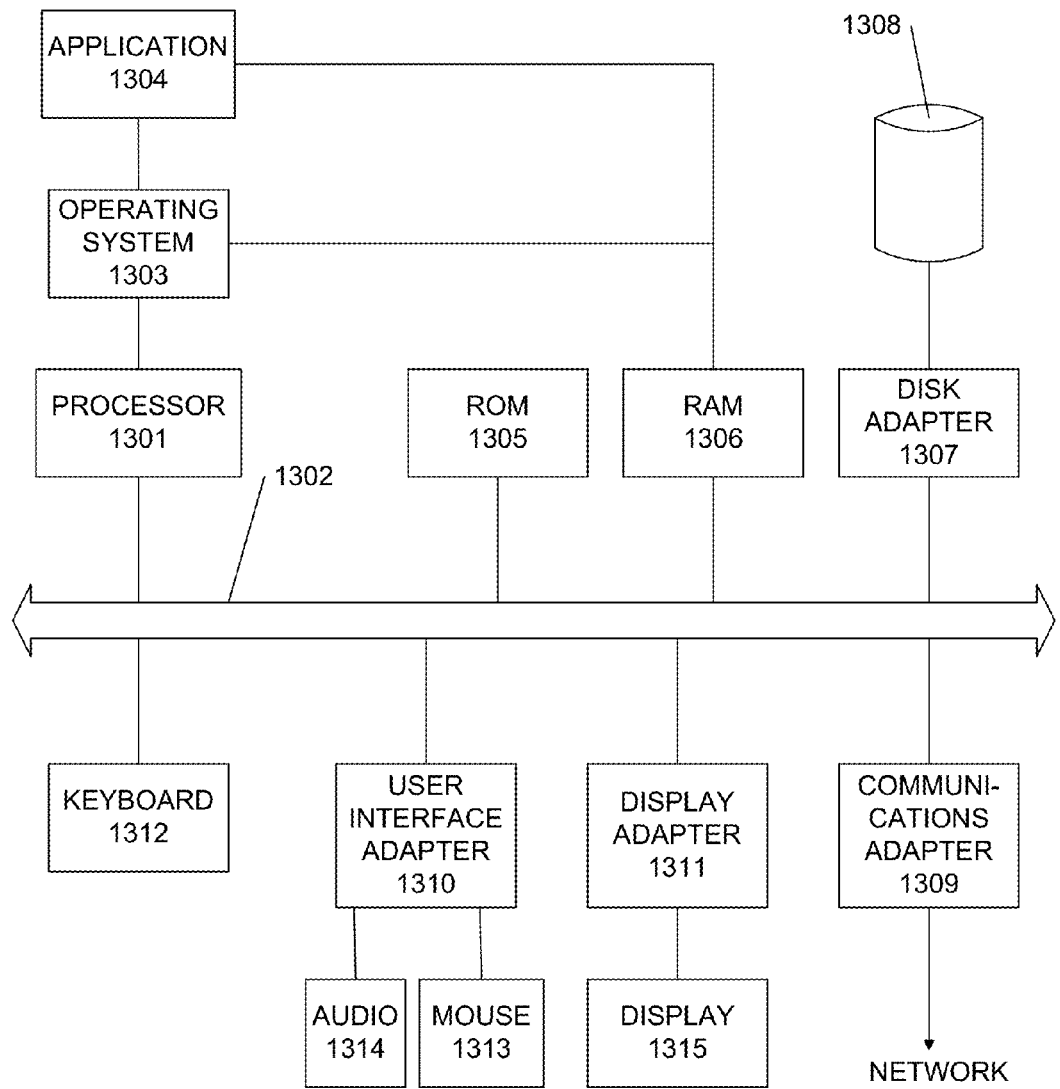
FIG. 13 is a block diagram showing details of a computer system configured in accordance with an embodiment of the present invention.

FIG. 13 is a block diagram showing details of a computer system configured in accordance with an embodiment of the present invention. FIG. 13 illustrates an embodiment of a hardware configuration of a computer system 1300 that is representative of a hardware environment for practicing the present invention. In FIG. 13, the computer system 1300 may include a processor 1301 coupled to various other components by a system bus 1302. An operating system 1303 may run on the processor 1301 so as to provide control and coordinate the functions of the various components of FIG. 13. Program instructions may be executed by the processor 1301 through the operating system 1303 to provide an application 1304 in accordance with the principles of the present invention that implements the various functions or services to be performed in accordance with the description herein. The application 1304 may include, for example, functions and operations for estimating defocus in individual natural images as discussed further below.

Referring again to FIG. 13, a read-only memory ("ROM") 1305 may be coupled to the system bus 1302 and may include a basic input/output system ("BIOS") that controls certain basic functions of the computer system 1300. A random access memory ("RAM") 1306 and a disk adapter 1307 may also be coupled to the system bus 1302. It should be noted that software components including the operating system 1303 and application 1304 may be loaded into the RAM 1306, which may be the main memory of the computer system 1300 for execution. The disk adapter 1307 may be an integrated drive electronics ("IDE") adapter or the like that communicates with a storage unit 1308, e.g., a memory unit, hard disk drive, or solid state drive. It is noted that the program for estimating defocus in individual natural images as discussed further below may reside in the disk unit 1308 or in the application 1304. Data relating to processing operations, such as look-up tables, inputs, and output values, parameters, and the like, may be stored in the memory 1305, 1306, 1308.

The computer system 1300 may further include a communications adapter 1309 coupled to the bus 1302. A communications adapter 1309 may interconnect the bus 1302 with an outside network (not shown) through a network interface, thereby allowing the computer system 1300 to communicate with other similar devices. Alternatively, the computer system 1300 may be embedded within a device such as a camera or digital microscope, each having an optical system that directs light from an object onto a sensor array such that the optical system can be adjusted to proper focus in accordance with the description herein.

Input/output (I/O) devices may also be connected to the computer system 1300 via a user interface adapter 1310 and a display adapter 1311. A keyboard 1312, mouse 1313, and a speaker 1314 may all be interconnected to the bus 1302 through the user interface adapter 1310. Data may be input to the computer system 1300 through any of these devices. A display monitor 1315 may be connected to the system bus 1302 by the display adapter 1311. In this manner, a user can provide inputs to the computer system 1300 through the keyboard 1312 or mouse 1313, and can receive output from the computer system 1300 via the display 1315 or speaker 1314.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module", or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer-readable signal medium or a non-transitory computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable storage medium would include the following: a portable computer diskette, a hard disk, a random access memory (RAM), a read-only memory (ROM), an erasable programmable read-only memory (EPROM or flash memory), a data storage media such as a compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to product a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

CONCLUSION

RCM denoising is remarkably effective given its conceptual and computational simplicity. In this approach, recursive conditional means are measured directly (by simple averaging) from a large training set of natural images, for small (3 element) context vectors. Denoising with the resulting fixed set of tables exceeds state-of-the-art algorithms in accuracy for realistic camera noise and matches them for additive white Gaussian noise. RCM denoising is much faster than state-of-the-art algorithms. This speed allows the method to be applied to very large images and, with further optimization, should allow it to be applied to video in real time.

The recursive conditional means approach has also proved to be very effective for the task of upsampling (super resolution, see, e.g., Geisler, W. S., & Perry, J. S. (2011). Statistics for optimal point prediction in natural images, *Journal of Vision*, 11(12):14, 1-17, doi:10.1167/11.12.14), and thus it is likely to be effective for a number of other basic image processing tasks.

What is claimed is:

1. A method of estimating an original value of a pixel in a digital image, said method comprising:
   (i) identifying noise in a high quality digital image and producing a digital image noise model;
   (ii) adding model noise based on said digital image noise model to a plurality of ground-truth digital images and producing a plurality of training images;
   (iii) recursively measuring and applying conditional means to a plurality of different local pixel contexts based on said training images and producing a look-up table comprising estimates of point (pixel) values;
   (iv) terminating the recursive measuring and applying conditional means to a plurality of different local pixel contexts based on said training images when the convergence of the conditional means indicates an asymptote; and
   (v) assigning a value to a pixel in a digital image using said estimates of point (pixel) values in said look-up table.

2. The method of claim 1, wherein said estimates of point (pixel) values are the optimal Bayesian estimates of point (pixel) values.

3. The method of claim 1, wherein said conditional means for a plurality of different local pixel contexts are derived from a number of different small pixel neighborhoods comprising context regions.

4. The method of claim 1, wherein said look-up table is a stored and fixed table.

5. The method of claim 1, wherein the context vectors for measuring and applying said conditional means consist of three 8-bit variables.

6. The method of claim 1, wherein the conditional means for each different local pixel context provides the Bayes optimal minimum mean squared error (MMSE) estimate.

7. The method of claim 1, wherein said digital image is derived from a digital video.

8. The method of claim 1, wherein said the original value of a plurality of pixels in a digital image are identified thereby denoising said digital image.

9. A system for estimating an original value of a pixel in a digital image, said system comprising:
   a processor configured to:
      identify noise in a high quality digital image and produce a digital image noise model;
      add model noise based on said digital image noise model to a plurality of ground-truth digital images and produce a plurality of training images;
      recursively measure and apply conditional means for a plurality of different local pixel contexts based on said training images and produce a look-up table comprising estimates of point (pixel) values;
      terminate the recursive measuring and applying conditional means to a plurality of different local pixel contexts based on said training images when the convergence of the conditional means indicates an asymptote; and
      assign a value to a pixel in a digital image using said estimates of point (pixel) values in said look-up table; and
   memory configured to store said look-up table.

10. The system of claim 9, wherein said estimates of point (pixel) values are the optimal Bayesian estimates of point (pixel) values.

11. The system of claim 9, wherein said conditional means for a plurality of different local pixel contexts are derived from a number of different small pixel neighborhoods comprising context regions.

12. The system of claim 9, wherein said look-up table is a fixed table.

13. The system of claim 9, wherein the context vectors for measuring and applying said conditional means consist of three 8-bit variables.

14. The system of claim 9, wherein the conditional means for each different local pixel context provides the Bayes optimal minimum mean squared error (MMSE) estimate.

15. The system of claim 9, wherein said digital image is derived from a digital video.

16. The system of claim 9, wherein said the original value of a plurality of pixels in a digital image are identified thereby denoising said digital image.

17. A method of generating a denoised image comprising:
   (a) receiving at least one input image at a processor;
   (b) identifying a plurality of denoising contexts within the at least one input image, wherein the denoising contexts comprise a location and selected areas proximate to the location;
   (c) identifying a Bayes optimal estimate, wherein identifying the Bayes optimal estimate comprises measuring local statistics within the plurality of denoising contexts, wherein the local statistics comprise at least one of a conditional mean and a conditional variance based on the measured local statistics;
   (d) generating at least one next image based on the Bayes optimal estimate;
   (e) identifying a plurality of next image denoising contexts within the at least one next image, wherein the denoising contexts comprise a location and selected areas proximate to the location;
   (f) measuring next image local statistics within the plurality of next image denoising contexts, wherein the next image local statistics comprise at least one of a conditional mean and a conditional variance; and
   (g) determining whether the next image local statistics and the local statistics indicate an asymptote.

18. The method of claim 17, wherein, if the next image local statistics and the local statistics do not indicate an asymptote, steps (a) through (g) are repeated, and wherein the input image of step (a) is the at least one next image.

19. The method of claim 17, wherein measuring the local statistics within the plurality of denoising contexts comprises directly measuring the local statistics from the denoising contexts.

20. The method of claim 19, wherein directly measuring the local statistics from the denoising contexts comprises generating the local statistics without use of assumptions about underlying probability distributions.

* * * * *